United States Patent
Gemmati et al.

(10) Patent No.: US 8,181,550 B2
(45) Date of Patent: May 22, 2012

(54) ROTARY ACTUATOR INCORPORATING A FORCE RELATIONSHIP, AND A METHOD OF REDUCING ANGULAR SLACK IN SUCH A ROTARY ACTUATOR

(75) Inventors: Bernard Gemmati, Lauris (FR); Romuald Biest, Les Milles (FR)

(73) Assignee: Eurocopter, Marignane Cedex (FR)

( * ) Notice: Subject to any disclaimer, the term of this patent is extended or adjusted under 35 U.S.C. 154(b) by 420 days.

(21) Appl. No.: 12/622,936

(22) Filed: Nov. 20, 2009

(65) Prior Publication Data

US 2010/0127121 A1    May 27, 2010

(30) Foreign Application Priority Data

Nov. 21, 2008   (FR) ...................................... 08 06557

(51) Int. Cl.
*G05G 1/00* (2008.04)

(52) U.S. Cl. ........................................................ 74/470

(58) Field of Classification Search ............... 74/469, 74/470, 471 XY, 491, 813 R; 318/632; 244/220, 244/221, 223, 224, 227; 267/73, 154, 155
See application file for complete search history.

(56) References Cited

U.S. PATENT DOCUMENTS

| 2,514,394 | A  | * | 7/1950 | Irving | ............................. | 464/57 |
| 4,228,386 | A  | * | 10/1980 | Griffith | ........................ | 318/628 |
| 7,681,842 | B2 | * | 3/2010 | Hors et al. | .................... | 244/234 |
| 2009/0189024 | A1 | * | 7/2009 | Hors et al. | .................... | 244/221 |

FOREIGN PATENT DOCUMENTS

| EP | 2033892 | A | 3/2009 |
| FR | 2137300 | A | 12/1972 |
| FR | 2330591 | A | 6/1977 |
| FR | 2438585 | A | 5/1980 |
| FR | 2872128 | A | 12/2005 |

OTHER PUBLICATIONS

Search Report and Written Opinion; Application No. FR 0806557; dated Jul. 3, 2009.

* cited by examiner

*Primary Examiner* — Vicky Johnson
(74) *Attorney, Agent, or Firm* — Brooks Kushman P.C.

(57) ABSTRACT

A rotary actuator incorporating a force relationship includes a twistably-deformable structure having a first and a second end plate and a helical spring with a first and a second terminal end secured on the first and the second end plate, respectively, and wherein the first and the second end plate have a first and a second notch, respectively, and wherein the first and the second notch have a first and a second contact zone, respectively. The rotary actuator further includes an outlet shaft and a motor assembly having an outlet gear configured to drive the twistably-deformable structure so as to drive the outlet shaft in rotation, wherein the motor assembly, the twistably-deformable structure and the outlet shaft are disposed in succession. The rotary actuator has a first finger constrained to rotate with the outlet gear and a second finger constrained to rotate with the outlet shaft.

12 Claims, 3 Drawing Sheets

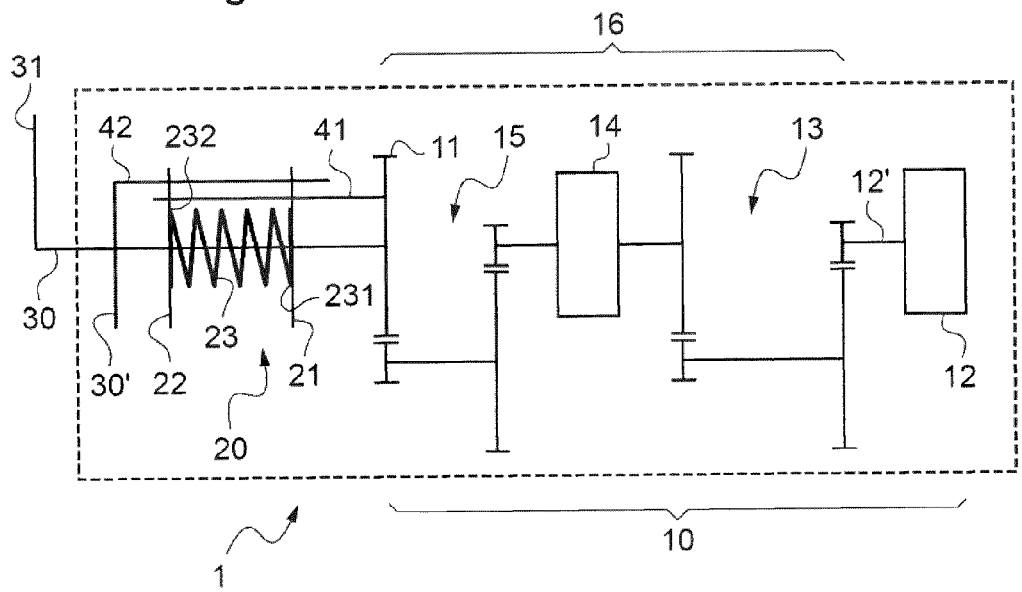
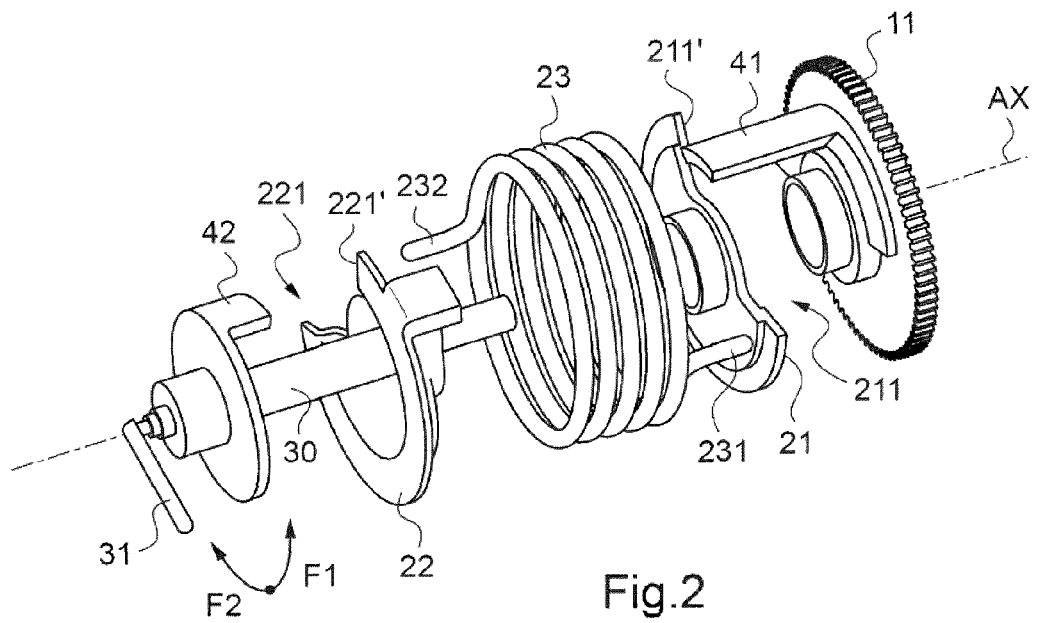

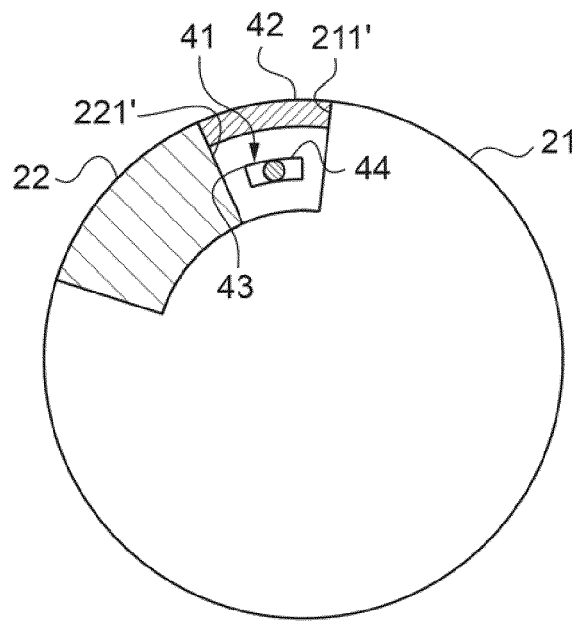
Fig.5
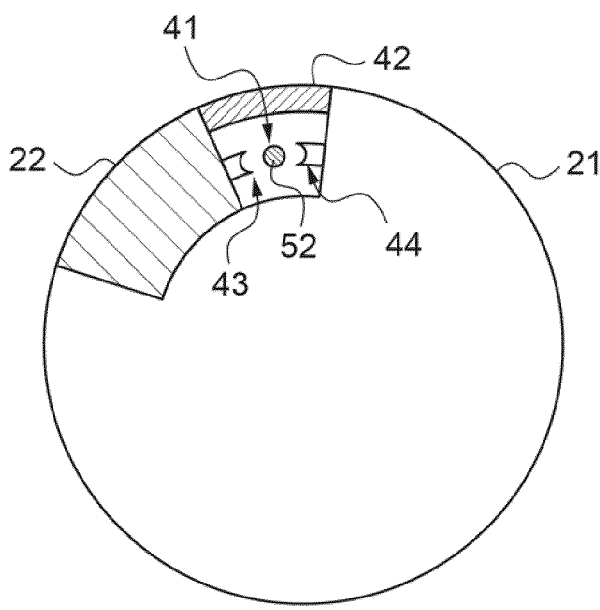
Fig.6
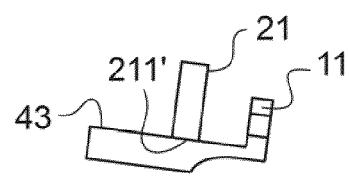
Fig.7
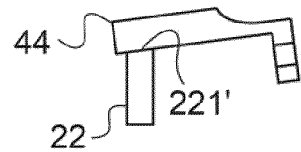

ROTARY ACTUATOR INCORPORATING A FORCE RELATIONSHIP, AND A METHOD OF REDUCING ANGULAR SLACK IN SUCH A ROTARY ACTUATOR

Priority is claimed to French Application No. FR 08 06557, filed on Nov. 21, 2008, the entire disclosure of which is incorporated by reference herein.

The present invention relates to a rotary actuator incorporating a force relationship, and to a method of reducing angular slack in such a rotary actuator.

BACKGROUND

In an aircraft, and more particularly in a helicopter, it is conventional to find actuators arranged in parallel or in series in flight control linkages. Such actuators arranged in parallel are usually referred to as trim actuators by the person skilled in the art.

Thus, a helicopter may include a trim rotary actuator associated with its longitudinal flight controls, a trim rotary actuator associated with its lateral flight controls, a trim rotary actuator associated with its collective pitch flight controls, and a trim rotary actuator associated with its yaw flight controls.

Each trim actuator then performs first and second functions. The first function is to improve pilot comfort by enabling the pilot to set a given control in a given position. For example, by setting the collective pitch trim actuator, the pilot no longer needs to maintain collective pitch by using the appropriate control lever and can therefore pay attention to other tasks. The second function of a trim actuator consists in enabling the neutral position of a flight control to be adjusted.

Furthermore, if the aircraft is fitted with an autopilot, the trim actuator can provide information to the autopilot system. A sensor measures the position of a mechanical element of a trim actuator and forwards this information to the autopilot system which deduces therefrom the position of the associated flight control. Under such conditions, a trim actuator is generally a rotary actuator having a motor that imparts rotary drive to an outlet shaft connected to the associated flight control by a link.

Furthermore, it should be observed that the trim rotary actuator includes a twistably-deformable structure suitable for determining a reaction force relationship for the flight control, where the reaction perceived by the pilot acting on the flight control is in fact delivered by the twistably-deformable structure.

Document FR 2 137 300 discloses a first type of trim rotary actuator. That rotary actuator has an outlet shaft secured to a link, i.e. a pivoted link forming part of a linkage. A lever is secured to a first end of the outlet shaft and a toothed sector is free to rotate about the second end of said outlet shaft. The toothed sector co-operates with a motor via stepdown gearing. In addition, the rotary actuator is provided with a twistably-deformable structure for generating a reaction force.

The twistably-deformable structure includes a helical torsion spring surrounding the outlet shaft with the terminal ends thereof being fastened to first and second gripper arms. These first and second gripper arms that are free to turn about the outlet shaft are provided with respective first and second plates.

Under such conditions, the lever and the toothed sector include drive means that cooperate with the twistably-deformable structure. More precisely, the drive means comprise first and second flat fingers that are secured respectively to the lever and to the toothed sector. Thus, the first and second flat fingers face each other so that each of them is clamped between the first and second gripper arms of the twistably-deformable structure.

When the pilot acts on a flight control, that causes the outlet shaft to move and consequently causes its lever to move. Since the toothed sector is stationary, the terminal end of the helical spring secured to the gripper arm in contact with the second flat finger connected to the toothed sector does not move, while, on the contrary, the terminal end of the helical spring secured to the gripper arm in contact with the first flat finger connected to the lever is caused to move by the lever. The helical spring is then stressed in torsion and generates a force that the pilot can feel.

When the pilot releases the flight control, the helical spring tends to return to its initial position corresponding to the neutral position of the flight control.

Document FR 2 330 591 describes a second type of rotary actuator. Its toothed sector is secured to a sheath that surrounds the twistably-deformable structure and the outlet shaft. The twistably-deformable structure then has first and second angular sectors interconnected by a helical spring and co-operating with drive means for the sheath and for the outlet shaft, i.e. abutments and pins.

Rotary actuators of both the first and the second types are effective. Nevertheless, it is necessary to ensure that there is no slack between the twistably-deformable structure and the actuator drive means. Any angular gap, even if very small, between the twistably-deformable structure and the actuator drive means can correspond to a significant movement of the aircraft flight control.

Thus, such angular slack is particularly awkward for a flight control provided with first and second rotary actuators arranged respectively in parallel and in series with the flight control linkage, the first actuator being a trim actuator and the second actuator conventionally tending to act on the flight controls at a frequency that is relatively high. If the first rotary actuator presents angular slack, then the pilot, will feel shaking in the flight control. Consequently, certain aircraft are provided with damper means that are heavy and expensive in order to attenuate the sensed shaking.

Similarly, since the autopilot measures the angular positions of elements secured to the helical spring of the twistably-deformable structure, the first and second gripper arms for an actuator of the first type or the angular sectors for an actuator of the second type, it is appropriate to minimize slack between the various elements in order to guarantee good accuracy.

A first solution consists in imposing extremely severe manufacturing tolerances. However that first solution turns out to be either insufficient or else too expensive. In accordance with document FR 2 438 585, a second solution consists in limiting angular slack after the rotary actuator has been manufactured, by including, a spacer. Nevertheless, that operation appears once more to be difficult.

SUMMARY OF THE INVENTION

An aspect of the present invention is thus to propose a rotary actuator enabling the above-mentioned limitations to be overcome and suitable for presenting angular slack that is negligible or even non-existent.

According to the invention, a rotary actuator incorporating a force relationship, the actuator comprises in succession a motor assembly, a twistably-deformable structure, and an outlet shaft, the motor assembly being provided with an outlet gear suitable for driving the outlet shaft in rotation via the twistably-deformable structure, the twistably-deformable structure being provided with first and second end plates respectively provided with first and second notches and secured to respective terminal ends of a helical spring, the rotary actuator possessing first and second fingers, each extending longitudinally parallel to a twist axis of the deformable structure so that each of them co-operates with the first, and second endplates by passing through the deformable structure, the first finger being constrained to rotate with the outlet gear while the second finger is constrained to rotate with the outlet shaft.

This rotary actuator is remarkable in that the first and/or second fingers constitute at least one adjustable finger that is fitted with adjustment means suitable for pressing said adjustable finger against a first contact zone of the first notch of the first end plate and against a second contact zone of the second notch of the second end plate. Consequently, the adjustment means make it possible to guarantee there is no slack between the first and second fingers and the twistably-deformable structure.

Furthermore, the rotary actuator may be provided with one or more of the following non-essential characteristics.

Thus, it is for example advantageous for only one of the fingers to be adjustable, namely the first finger or the second finger. As explained below, this disposition is sufficient for guaranteeing that there is no angular slack. Furthermore, the adjustable finger is optionally symmetrical about a longitudinal midplane in order to optimize its operation.

Furthermore, the adjustable finger includes first and second branches separated by a slot passing longitudinally through said adjustable finger, and said adjustment means is arranged in said slot so as to be suitable for causing the first and second branches to move away from their initial position.

Action by an operator on the adjustment means enables the first and second branches of the adjustable finger to be spaced apart in a transverse direction so as to press them against the first and second end plates. Under drive from the operator, the adjustment means exert a force on the first and second branches, thereby causing the free end zone thereof to move. More precisely, one branch is pressed against the first contact zone of the first end plate while the other branch is pressed against the second contact zone of the second end plate.

Under such conditions, the adjustable finger includes first and second branches that are separated by a slot passing longitudinally right through the adjustable finger. The slot comprises in succession first and second reception zones going from a fixed end zone of the adjustable finger, mechanically connected to the outlet shaft or to the outlet gear in function of concerned finger, towards a free end zone of the adjustable finger opposite from the fixed end zone, and the adjustment means comprise a tapped insert arranged in particular in the first reception zone of the slot and a screw arranged in the second reception zone of the slot. The screw is then suitable for exerting a force on the first and second branches so as to space them apart from their initial position. Furthermore, the screw is a screw with a conical tip, and the second reception zone includes a conical portion at its free end zone that co-operates with the conical tip to move the first and second branches apart from their initial position.

The conical portion of the second reception zone receiving said screw then constitutes an obstacle against which the screw bears as it advances longitudinally along the slot. The pressure exerted by the conical tip of the screw on the conical portion of the second reception zone causes the free ends of the first and second branches to move. Furthermore, the second reception zone advantageously presents a shape that is cylindrical in order to guide said screw of the adjustment means, the head of the screw being arranged, in contrast, in the first reception zone of the slot of the adjustable finger.

Optionally, the first and second branches are of reduced thickness in the first reception zone of the slot so as to facilitate transverse movement of their free ends, said first reception zone having a first width in a transverse direction that is greater than a second width of the second reception zone in said transverse direction.

Finally, the first branch includes a first bearing zone suitable for co-operating with the first contact zone, the second branch includes a second bearing zone suitable for co-operating with the second contact zone, and the first and second bearing zones are both in register with the second reception zone in order to avoid additional local deformation. The present invention also provides a method implementing, the above-described rotary actuator.

The invention provides a method of reducing slack in a rotary actuator incorporating a force relationship, the actuator comprising, in succession a motor assembly, a twistably-deformable structure, and an outlet shaft, said motor assembly being provided with an outlet gear suitable for driving said outlet shaft in rotation via said twistably-deformable structure, said twistably-deformable structure being provided with first and second end plates respectively provided with first and second notches and secured to respective terminal ends of a helical spring, said rotary actuator possessing first and second fingers, each extending longitudinally parallel to a twist axis of said deformable structure so that each of them co-operates with said first and second end plates by passing through said deformable structure, said first finger being constrained to rotate with said outlet gear while said second finger is constrained to rotate with said outlet shaft, which method is remarkable in that the following steps are performed:

a) pressing one of the first and second fingers against a first contact zone of the first notch of the first end plate and against a second contact zone of the second notch of the second end plate;

b) maneuvering an adjustable finger, i.e., the finger that is not manipulated during step a), so as to cause it to pass through the first and second notches of the twistably-deformable structure without coming into contact with the first and second contact zones; and c) with said adjustable finger being fitted with adjustment means suitable for pressing, said adjustable finger against a first contact zone of the first notch of the first end plate and against a second contact zone of the second notch of the second end plate, using said adjustment means of said adjustable finger to press said adjustable finger against the first contact zone of the first notch of the first end plate and against the second contact zone of the second notch.

Thus, it suffices to fit, only one finger with adjustment means in order to guarantee there is no angular slack in the rotary actuator.

Furthermore, said adjustment means are suitable for moving first and second branches of said adjustable finger apart, and during step c), said first and second branches are moved apart from an initial position so as to be pressed respectively against the first and second contact zones. Thus, the adjustable finger voluntarily presents slack when it is arranged in the twistably-deformable structure, and said slack can easily be taken up by the adjustment means.

BRIEF DESCRIPTION OF THE DRAWINGS

The invention and its advantages appear in greater detail from the following description of an embodiment given by way of illustration and with reference to the accompanying drawings, in which:

FIG. 1 is a diagram showing, the various members of the rotary actuator;

FIG. 2 is an exploded view of the twistably-deformable structure of the actuator, together with the first and second fingers that co-operate with said twistably-deformable structure;

FIG. 5 is a diagram showing steps a) and b) of the method of the invention; and

FIGS. 6 and 7 are diagram showing step c) of said method.

Figure 3:
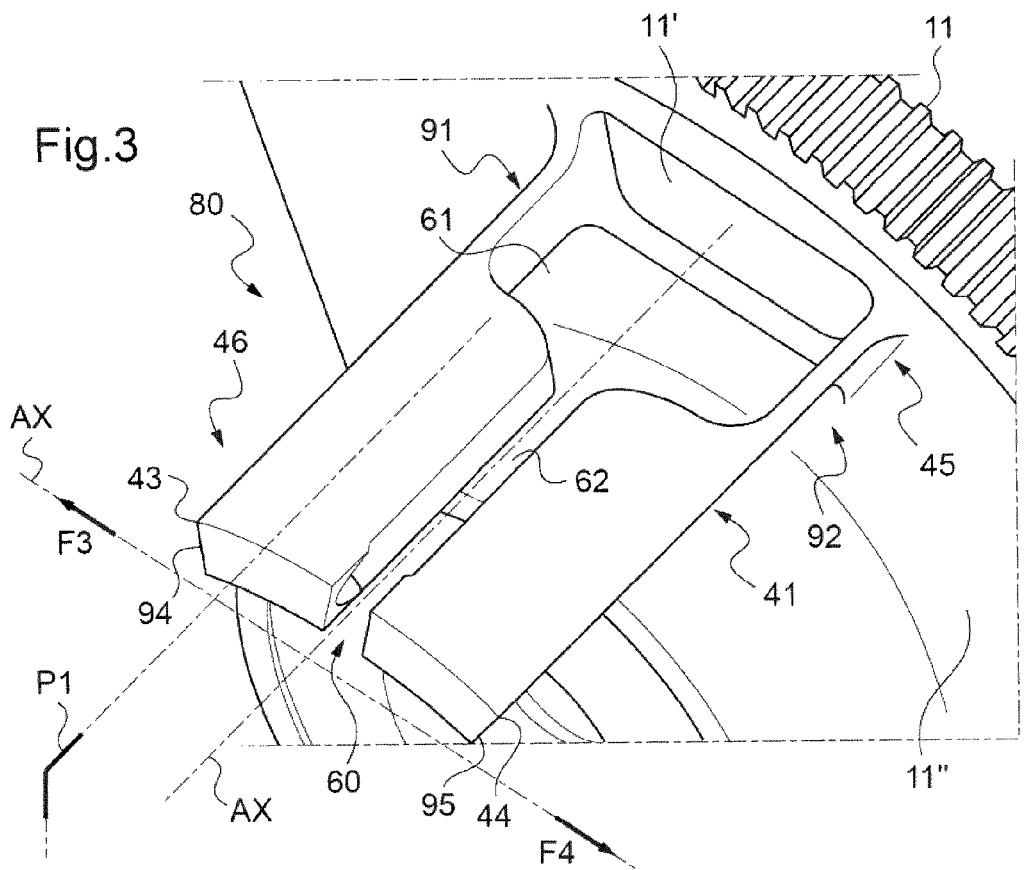
FIG. 3 is a diagrammatic view showing the slot of an adjustable finger of the invention.

Elements that are present in more than one of the figures are given the same reference in each of them.

DETAILED DESCRIPTION

FIG. 1 is a diagrammatic view of a rotary trim actuator for an aircraft connected to a flight control linkage by a link 31.

The rotary actuator 1 comprises a motor assembly 10 fitted in succession with a motor 12 suitable for imparting rotation to an outlet gear 11 of the motor assembly 10, e.g. a toothed wheel.

More precisely, the motor 12 drives the outlet gear 11 via a stepdown gearbox 16 comprising first gearing 13, a clutch 14, and then second gearing 15.

In the variant shown, the outlet gear 11 also forms part of a stepdown stage of the second gearing 15.

Nevertheless, it will be understood that the outlet gear 11 could be set into motion by the motor 12 in other ways without going beyond the ambit of the invention, for example it could be secured directly to the outlet shaft 12' of the motor 12.

The outlet gear 11 is mechanically linked with a twistably-deformable structure 20, said twistably-deformable structure also being mechanically connected to an outlet shaft 30 of the rotary actuator that is constrained to rotate with the link 31.

Thus, the twistably-deformable structure 20 comprises a first circular end plate 21 that is perpendicular to the twisting axis AX of the deformable structure 20, and that is also provided with a notch occupying an annular sector.

Similarly, the twistably-deformable structure 20 includes a second circular end plate 27 that is perpendicular to the twisting axis AX of the deformable structure 20, and that is also provided with a notch describing an annular sector.

The first and second end plates 21 and 22 are then mutually parallel, being respectively connected together via first and second terminal ends 231 and 232 of a torsion spring 23, i.e. a helical spring.

Advantageously, the deformable structure is arranged around a portion of the outlet shall 30, said deformable structure 20 nevertheless being free to turn about said outlet shaft 30. Consequently, rotation of the outlet shaft about its axis of symmetry does not necessarily lead to rotation of the deformable structure as a whole.

Under such circumstances, the rotary actuator 1 has a first finger 41 constrained to rotate with the outlet gear 11, the first finger 41 having a fixed end secured to the outlet gear.

The first finger 41 then passes in succession through the first and second notches of the first and second end plates 21 and 22 of the twistably-deformable structure 20 so that the outlet gear 11 is mechanically connected to the deformable structure 20.

Thus, the first finger 41 extends longitudinally in a direction parallel to the outlet shaft 30 from the gear 11 towards the link 31, while passing through the deformable structure 20.

Similarly, the rotary actuator 1 includes a second finger 42 constrained to rotate with the outlet shaft 12. The second finger 42 possesses a fixed end that is secured to a circular plate 30' constrained to rotate with the outlet shaft 30 and parallel to the outlet gear 11, to the first end plate 21, and to the second end plate 22. The second finger 42 then passes successively through the second and first notches of the second and first end plates 22 and 21 of the twistably-deformable structure 20 so that the outlet shaft 30 is mechanically connected to the deformable structure 20.

Thus, the second finger 42 extends longitudinally in a direction parallel to the outlet shaft 30 from the circular plate 30' of the outlet shaft 30 towards the gear 11 by passing through the deformable structure 20. It should be observed that each of the first and second fingers 41 and 42 is in the form of a long and flat finger describing an arc, these first and second fingers being concentric.

Furthermore, in order to limit the overall size of the rotary actuator, it is possible to envisage arranging the outlet gear around a portion of the outlet shaft 30. Nevertheless, a ball bearing then needs to be arranged between said outlet shaft 30 and the outlet gear 11 so that the two members 11 and 30 are not mechanically connected together in a direct manner.

FIG. 2 is an exploded diagram explaining the operation of the rotary actuator 1. At rest, i.e. when the deformable structure 20 is not stressed by the motor 12 via the outlet gear 11 or by the flight control linkage via the link 31, the first finger 41 that is constrained to rotate about the twist axis AX of the outlet gear 11 passes successively through the first notch 211 of the first end plate 21, the helical spring 23, and then the second notch 221 of the second end plate 22.

More precisely, the first finger 41 needs to be in contact firstly with a first contact zone 211' of the first end plate defining part of the first notch 211, and secondly with a second contact zone 221' of the second end plate 22 defining part of the second notch 221.

Similarly, the second finger 42 that is constrained to rotate about the twist axis AX of the outlet shaft 30 passes successively through the second notch 221 of the second end plate 22, the helical spring 23, and then the first notch 211 of the first end plate 21.

More precisely, the second finger 42 needs to be in contact firstly with the first contact zone 211' of the first end plate defining, part of the first notch 211, and secondly with the second contact zone 221' of the second end plate 22 defining part of the second notch 221.

Optionally, it is possible to envisage the first and second contact zones 211' and 221' projecting respectively from the first and second end plates so as to have an optimized contact surface.

When the pilot maneuvers the aircraft so as to cause the link 31 to move counterclockwise, as represented by arrow F1, the first finger exerts pressure on the first contact zone 211' of the first end plate 21 and tends to cause the first end plate to turn.

Since the outlet gear 11 is prevented from moving by the motor 12, the second end plate cannot turn counterclockwise. Consequently, the helical spring is subjected to torsion stress and generates a force relationship that is physically sensed by the pilot.

Similarly, when the pilot maneuvers the aircraft so as to cause the link 31 to move clockwise, as represented by arrow F2, the first finger exerts pressure on the second contact zone 221' of the second end plate 22 and tends to cause said second end plate to turn.

Since the outlet gear 11 is prevented from moving by the motor 12, the first end plate cannot turn clockwise. Consequently, the helical spring is subjected to torsion stress and generates a force relationship that is physically sensed by the pilot.

It can thus be understood that the first and second fingers must genuinely come into contact, at rest, with the first and second contact zones 211' and 221', in particular so as to ensure that the sensations felt by the pilot are not erroneous.

Furthermore, position sensors are also often arranged in the rotary actuator to determine the positions of the first and second end plates. Thus, an autopilot can determine the positions of the flight controls on the basis of the information it receives.

The presence of clearance between the first and second fingers and the first and second contact zones 211' and 221' would then disturb proper operation of the rotary actuator and of the autopilot. In order to guarantee that there is no clearance, i.e. no angular slack, at least one finger is an adjustable finger of shape that can be modified by adjustment means.

Figure 4:
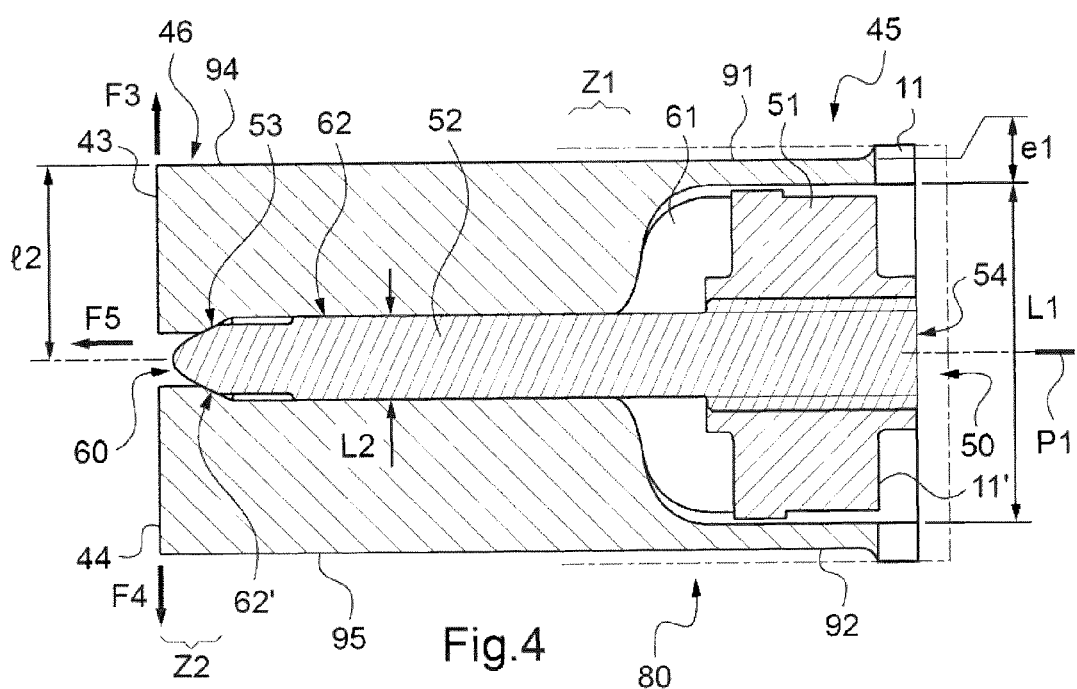
FIG. 4 is a plan view of an adjustable finger provided with adjustment means.

FIGS. 3 and 4 show such an adjustable finger 80, specifically the first finger 41 secured to the outlet gear 11 via its fixed end zone 45. The adjustable finger 80 has first and second branches 43 and 44 that are separated by a slot 60. The slot 60 divides the adjustable finger 80 longitudinally all along its length. Thus, the slot 60 has respective open ends adjacent to the fixed end zone 45 and adjacent to the free end zone 46 of the adjustable finger 80 that is longitudinally remote from the fixed end zone 45 secured in the outlet gear 11.

Consequently, the outlet gear 11 includes an opening 11' so that the slot 60 opens to the outside as opposed to the face 11" from which the adjustable finger 80, i.e. the first finger 41, projects. Furthermore, the slot 60 has two distinct zones, namely and in succession: first and second zones 61 and 62 for receiving adjustment means going from a fixed end zone 45 of the adjustable finger engaged in the outlet gear 11 to a free end zone of the adjustable finger for passing through the deformable structure 20.

Thus, the adjustable finger can receive within its slot 60 adjustment means that are suitable for moving the free ends 94 and 95 of the first and second branches 43 and 44 in a transverse direction AX' away from an initial position. This transverse direction is thus orthogonal to a midplane of symmetry P1 of the adjustable finger that also contains the twist axis AX of the deformable structure 20.

With reference to FIG. 4, the adjustment means 50 comprise a screw 52 and an insert 51 provided with a tapped orifice for receiving said screw 52. Thus, the tapped insert 51 is arranged in the first reception zone 61, e.g. being engaged therein by force so as to be secured to the adjustable finger 80. The screw 52 of the adjustment means is then inserted in the insert so as to extended longitudinally in the first and second reception zones 61 and 62. It should be observed that the head 54 of the screw 52 is located in the first reception zone so that it can be accessed by an operator via the opening 11' in the outlet gear. In addition, in order to ensure that the screw is guided during its longitudinal movement, the second reception zone 62 is advantageously cylindrical in shape.

In order to optimize the effectiveness of the adjustment means 50, the screw 52 is provided with a conical end 53 remote from the head 54 and suitable for co-operating with a conical portion 62' of the second reception zone 62, this conical portion thus being located at the second end zone 46 of the adjustable finger 80. When an operator turns the head of the screw 52 clockwise, the screw co-operates with the tapping in the insert 51. The screw then moves in the longitudinal direction along arrow F5. The conical end 53 of the screw then presses against the conical portions 62' of the first and second branches 43 and 44. Consequently, the free ends 94 and 95 of the first and second branches 43 and 44 splay apart from their initial position in opposite transverse directions that are substantially perpendicular to the plane of symmetry P1, along arrows F3 and F4.

Under drive from the screw 52, the first and second branches tend to pivot about their fixed ends 91 and 92 that are secured to the outlet gear 11. To encourage this movement, it is advantageous for the first and second fixed ends 91 and 92 of the first and second branches 43 and 44 to be of reduced thickness so as to present width e1 that is small relative to the width e2 of the first and second free ends 94 and 95 of the first and second branches 43 and 44.

Thus, the first reception zone 61 has a first width L1 in the transverse direction that is greater than a maximum second width L2 of the second reception zone 62, said maximum second width L2 of the second reception zone 62 being substantially equal to the diameter of the screw 52. Nevertheless, it is possible to envisage designing first and second reception zones of identical width, even if such a variant is not optimized.

Furthermore, since the adjustable finger 80 is designed to be in contact with the first and second contact zones 211' and 221' of the deformable structure 20 respectively via first and second bearing zones Z1 and Z2, it is advantageous for the first and second bearing zones Z1 and Z2 to face the second reception zone 62. In this way, the first and second contact zones 211' and 221' are not in contact with the thin fixed ends 91 and 92 of the first and second branches 43 and 44, where appropriate.

FIGS. 3 and 4 show an adjustable finger, specifically the first finger 41. Nevertheless, it will readily be understood that this description can be applied to the second finger 42, the second finger being fixed for example to one of the faces of a disk secured to the outlet shaft 30. In addition, although it is possible to provide a tapped insert that is inserted by force, it appears to be advantageous to use a tapped insert having a rear surface that describes an area that is greater than that of the opening. Thus, when the screw of the adjustment means is engaged in the tapped insert, the adjustment can no longer escape from the slot in the adjustable finger. The adjustment means is then pressed hard against the conical portion of the adjustable finger and against the member having the opening, e.g. the outlet gear, respectively via the conical end of the screw and via the rear surface of the tapped insert.

More precisely, since the first and second branches tend to return towards their initial position, these first and second branches exert a force on the screw that presses the tapped insert against the outlet gear, where appropriate. Thus, there is no risk of the adjustment means losing adjustment in flight, said adjustment means being suitable for remaining in a given position without intervention from an operator.

FIGS. 5, 6, and 7 show the adjustment method of the invention. During step a) explained by FIG. 5, an operator presses one of the fingers, specifically the second finger connected to the outlet shaft 30, against a first contact zone 211' of the first notch 211 of the first end plate 21, and against a second contact zone 221' of the second notch 211 of the second end plate 22. It should be observed that it is possible to prestress the helical spring during step a) so as to guarantee that the finger is pressed against the first and second contact zones.

During a step b), performed before step c) and either after step a) or simultaneously with step a), an operator moves an adjustable finger, specifically the first finger 41 that was not manipulated in step a), so as to cause it to pass through the first and second notches 211 and 221 of the twistably-deformable structure 20 without coming into contact with the first and second contact zones 211' and 221'. Thus, unlike the second finger, the first finger 41 is not pressed against the first contact zone 211' nor is it pressed against the second contact zone 21'.

With reference to FIGS. 6 and 7, during a step c) following steps a) and b), with the first finger being an adjustable finger fitted with adjustment means 50, an operator uses the adjustment means 50 of the adjustable first finger 41 to press the first and second branches 43 and 44 against the first contact zone 211' of the first notch 211 of the first end plate 21 and against the second contact zone 221' of the second notch 221. Advantageously, and as shown in FIG. 7, during step c), the first and second branches 43 and 44 are spaced apart from an initial position to press them respectively against the first and second contact zones 211' and 221'.

Naturally, the present invention may be subjected to numerous variations as to its implementation. Although several embodiments are described, it will readily be understood that it is not feasible to identify exhaustively all possible embodiments. It is naturally possible to envisage replacing, any of the means described by equivalent means without going beyond the ambit of the present invention.

For example, the adjustment means described comprise a tapped insert and a screw. Nevertheless, it is possible to envisage a variant that comprises a threaded rod having engaged thereon a rotary element that is provided with sloping surfaces that co-operate with the first and second branches. Turning said rotary element on the threaded rod would then cause the first and second branches to move because of the inclined surfaces.

What is claimed is:

1. A rotary actuator incorporating a force relationship comprising:
   a twistably-deformable structure having a first and a second end plate and a helical spring with a first and a second terminal end secured on the first and the second end plate, respectively, and wherein the first and the second end plate have a first and a second notch, respectively, and wherein the first and the second notch have a first and a second contact zone, respectively;
   an outlet shaft;
   a motor assembly having an outlet gear configured to drive the twistably-deformable structure so as to drive the outlet shaft in rotation, wherein the motor assembly, the twistably-deformable structure and the outlet shaft are disposed in succession;
   a first finger constrained to rotate with the outlet gear and extending longitudinally parallel to a twist axis of the twistably-deformable structure so as to cooperate with the first end plate by passing through the twistably-deformable structure; and
   a second finger constrained to rotate with the outlet shaft and extending longitudinally parallel to the twist axis so as to cooperate with the second end plate by passing through the twistably-deformable structure, wherein at least one of the first and the second finger is an adjustable finger and includes an adjustment device configured to press the adjustable finger against the first contact zone and the second contact zone.

2. The rotary actuator as recited in claim 1, wherein only one of the first and the second finger is adjustable.

3. The rotary actuator as recited in claim 1, wherein the adjustable finger is symmetrical about a longitudinal midplane of the adjustable finger.

4. The rotary actuator as recited in claim 1, wherein the adjustable finger includes a first and a second branch separated by a slot passing longitudinally through the adjustable finger, and wherein the adjustment device is disposed in the slot so as to cause the first and the second branch to move away from an initial position.

5. The rotary actuator as recited in claim 1, wherein the adjustable finger includes a fixed end zone mechanically connected to one of the outlet shaft and the outlet gear, respectively, and a free end zone opposite the fixed end zone and a first and a second branch separated by a slot passing longitudinally through the at least one adjustable finger, wherein the slot includes a first and a second reception zone disposed in succession from the fixed end zone towards the free end zone, and wherein the adjustment device includes a tapped insert disposed in the first reception zone and a screw disposed in the second reception zone.

6. The rotary actuator as recited in claim 5, wherein the screw includes a conical tip, and wherein the second reception zone includes a conical portion at the free end zone, the conical portion configured to cooperate with the conical tip so as to move the first and the second branch apart from an initial position.

7. The rotary actuator as recited in claim 5, wherein the second reception zone has a cylindrical shape.

8. The rotary actuator as recited in claim 5, wherein the screw includes a head disposed in the first reception zone.

9. The rotary actuator as recited in claim 5, wherein the first and the second branch each have a reduced thickness in the first reception zone, the first reception zone having a first width in a transverse direction and the second reception zone having a second width, wherein the first width is greater than the second width.

10. The rotary actuator as recited in claim 5, wherein the first branch includes a first bearing zone configured to cooperate with the first contact zone and the second branch includes a second bearing zone configured to cooperate with the second contact zone, the first and the second bearing zone both aligned with the second reception zone.

11. A method of reducing slack in a rotary actuator incorporating a force relationship, the rotary actuator having a twistably-deformable structure having a first and a second end plate and a helical spring with a first and a second terminal end secured on the first and the second end plate, respectively, and wherein the first and the second end plate have a first and a second notch, respectively; an outlet shaft; a motor assembly having an outlet gear configured to drive the twistably-deformable structure so as to drive the outlet shaft in rotation, wherein the motor assembly, the twistably-deformable structure and the outlet shaft are disposed in succession; a first finger constrained to rotate with the outlet gear and extending longitudinally parallel to a twist axis of the twistably-deformable structure so as to cooperate with the first end plate by passing through the twistably-deformable structure; and a second finger constrained to rotate with the outlet shaft and extending longitudinally parallel to the twist axis so as to cooperate with the second end plate by passing through the twistably-deformable structure, wherein at least one of the first and the second finger is an adjustable finger and includes an adjustment device configured to press the adjustable finger against the first contact zone and the second contact zone, the method comprising:
   pressing one of the first and the second finger against a first contact zone of the first notch and against a second contact zone of the second notch; and
   maneuvering the adjustable finger so as to cause the adjustable finger to pass through the first and the second notch without coming; into contact with the first and the second contact zone; and moving the adjustment device to press the adjustable finger against the first contact zone and against the second contact zone.

12. The method as recited in claim 11, wherein the moving of the adjustment device includes moving the first and the second branch apart from an initial position so as to be pressed against the first and the second contact zone.

* * * * *